(12) United States Patent
Lye et al.

(10) Patent No.: US 7,800,581 B2
(45) Date of Patent: Sep. 21, 2010

(54) USER INPUT DEVICE WITH SELF-CENTERING FLAT SPRING

(75) Inventors: Poh Huat Lye, Penang (MY); Leslie Jen San Hum, Penang (MY); Beng Huat Low, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 923 days.

(21) Appl. No.: 11/521,879

(22) Filed: Sep. 15, 2006

(65) Prior Publication Data
US 2008/0068333 A1 Mar. 20, 2008

(51) Int. Cl.
G09G 5/00 (2006.01)
(52) U.S. Cl. .......................... 345/156; 345/157; 345/160
(58) Field of Classification Search ................. 345/156, 345/157, 160, 161; 267/140.13, 141.2, 141.4, 267/161, 167, 258
See application file for complete search history.

(56) References Cited

U.S. PATENT DOCUMENTS

| | | | |
|---|---|---|---|
| 5,541,622 A | 7/1996 | Engle et al. | |
| 7,304,254 B2* | 12/2007 | Ma et al. | 200/11 TW |
| 2002/0033798 A1* | 3/2002 | Nakamura et al. | 345/156 |
| 2004/0200700 A1* | 10/2004 | Ma et al. | 200/181 |
| 2005/0110747 A1* | 5/2005 | Harley et al. | 345/156 |
| 2006/0176270 A1* | 8/2006 | Sachs | 345/156 |
| 2006/0232551 A1* | 10/2006 | Matta | 345/156 |
| 2007/0091065 A1* | 4/2007 | Misek | 345/157 |
| 2007/0091066 A1* | 4/2007 | Harley | 345/157 |
| 2007/0159456 A1* | 7/2007 | Unkrich | 345/156 |
| 2007/0247423 A1* | 10/2007 | Harley et al. | 345/157 |

\* cited by examiner

*Primary Examiner*—Amare Mengistu
*Assistant Examiner*—Dmitriy Bolotin

(57) ABSTRACT

A user input device utilizes a self-centering flat spring to allow a user interface structure of the device to be manipulated by a user and to return the user interface structure back to its initial position.

19 Claims, 3 Drawing Sheets

USER INPUT DEVICE WITH SELF-CENTERING FLAT SPRING

BACKGROUND OF THE INVENTION

Conventional user input devices, such as joysticks, levers, knobs and buttons, typically include user interface structures that are manipulated and displaced by users. Some of these user input devices may require a mechanism to return the user interface structure back to its initial vertical position when the user interface structure is released by a user. Other user input devices may require a mechanism to return the user interface structure back to its lateral or horizontal position when the user interface structure is released.

The most common mechanism used to return a user interface structure of a user input device back to its initial vertical and/or lateral position is a coil spring. When a coil spring is released after being compressed, the coil spring will return to its resting length. Thus, a coil spring positioned below a user interface structure of a user input device can be used to return the user interface structure back to its initial vertical position. Furthermore, if one end of the coil spring is anchored, when the other end of the coil spring is released after being laterally displaced, the free end of the coil spring will return to its initial lateral position. Thus, the coil spring can be used to return the user interface structure back to its initial lateral position.

Since coil springs need to be anchored to function as self-centering mechanisms, the coil springs require additional components to anchor the coil springs to the user input devices. In addition, these additional components and the coil springs may need to be aligned to function properly. Thus, the self-centering coil springs can cause difficulties in manufacturing and assembly of the user input devices.

In view of these disadvantages, there is a need for a user input device with a self-centering mechanism that is easy to manufacture and does not require additional components for anchoring.

SUMMARY OF THE INVENTION

A user input device utilizes a self-centering flat spring to allow a user interface structure of the device to be manipulated by a user and to return the user interface structure back to its initial position. The self-centering flat spring does not require additional components for anchoring as conventional self-centering coil springs, which can ease manufacturing and assembly of the device.

A user input device in accordance with an embodiment of the invention comprises a self-centering flat spring comprising an inner portion, an outer rim portion and a flexible connecting portion. The inner portion includes a central hole. The outer rim portion is configured to surround the inner portion. The flexible connecting portion is attached to the inner portion and the outer rim portion. The flexible connecting portion is configured to bend so that the inner portion is displaced laterally when lateral pressure is applied to the inner portion. The flexible connecting portion is further configured to unbend so that the inner portion is returned to an initial position when the lateral pressure is removed.

A user input device in accordance with another embodiment of the invention comprises a self-centering flat spring and a user interface structure. The self-centering flat spring comprises an inner portion, an outer rim portion and a flexible connecting portion. The inner portion includes a central hole. The outer rim portion is configured to surround the inner portion. The flexible connecting portion is attached to the inner portion and the outer rim portion. The flexible connecting portion is configured to bend so that the inner portion is displaced laterally when lateral pressure is applied to the inner portion. The flexible connecting portion is further configured to unbend so that the inner portion is returned to an initial position when the lateral pressure is removed. The user interface structure includes a stem portion positioned in the central hole of the inner portion of the self-centering flat spring. The user interface structure is configured to be manipulated by a user.

Other aspects and advantages of the present invention will become apparent from the following detailed description, taken in conjunction with the accompanying drawings, illustrated by way of example of the principles of the invention.

DETAILED DESCRIPTION

Figure 1:
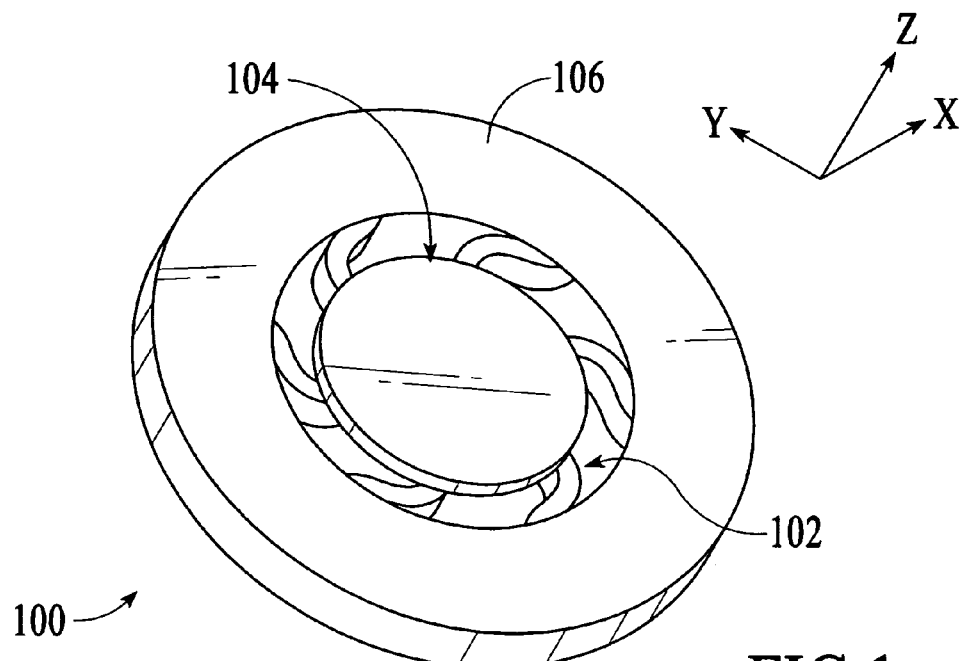
FIG. 1 is a perspective view of a user input device in accordance with an embodiment of the invention.
Figure 2:
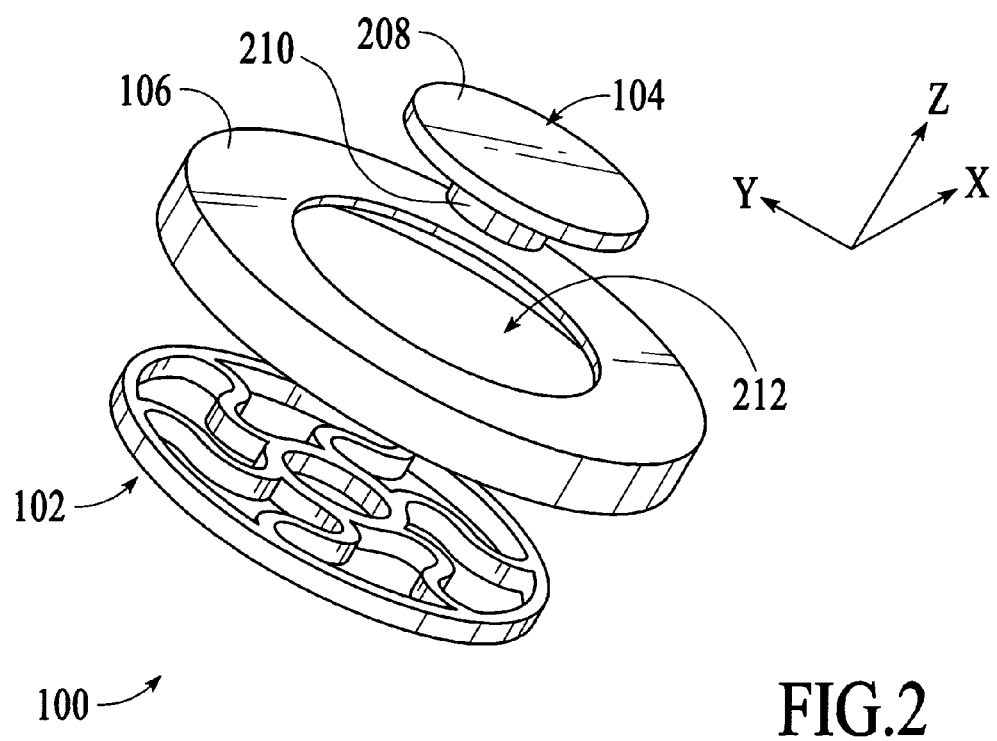
FIG. 2 is an exploded perspective view of the user input device of FIG. 1.

With reference to FIGS. 1 and 2, a user input device 100 in accordance with an embodiment of the invention is shown. FIG. 1 is a perspective view of the user input device 100, while FIG. 2 is an exploded perspective view of the user input device. The user input device 100 uses a self-centering mechanism in the form of a flat spring 102, which has advantages over a conventional self-centering coil spring. In contrast to a coil spring, the self-centering flat spring 102 does not require additional components to anchor the self-centering flat spring to another part of the user input device 100. As a result, the self-centering flat spring 102 can simplify manufacturing and assembly of the user input device 100.

As shown in FIGS. 1 and 2, the user input device 100 includes a user interface structure 104, the self-centering flat spring 102 and a retainer housing 106. The user interface structure 104 is designed to be manipulated by a user in any X-Y direction. The user interface structure 104 may also be designed to be depressed downward in the Z direction. As shown in FIG. 2, the user interface structure 104 includes a user interface portion 208 and a stem portion 210. The user interface portion 208 has a surface for a user to place a finger or a thumb to manipulate the user interface structure 104. In this embodiment, the user interface portion 208 is configured as a circular disk. However, in other embodiments, the user interface portion 208 may be configured as a plate in any shape. The stem portion 210 is attached to the lower surface of the user interface portion 208, for example, at its center. The stem portion 210 is designed to be supported by the self-centering flat spring 102, as described in detail below.

The self-centering flat spring 102 is designed to allow the user interface structure 104 to be displaced in any X-Y direction and to automatically return the user interface structure back to its initial lateral position, i.e., its original X-Y position, when the user interface structure is released. Furthermore, the self-centering flat spring 102 is also designed to allow the user interface structure 104 to be displaced downward in the Z direction and to automatically return the user interface structure back to its initial vertical position, i.e., its original Z position, when the user interface structure is released. Thus, the self-centering flat spring 102 allows a user to move the user interface structure 104 in any lateral direction and also to press down on the user interface structure. In addition, when the user interface structure 104 is released by the user, the self-centering flat spring 102 returns the user interface structure back to its initial lateral and vertical position so that the user interface structure can be used again. The self-centering flat spring 102 may be designed to be symmetrical about its center and may also be radially or rotationally symmetrical. As illustrated in FIG. 2, the self-centering flat spring 102 is a flat or planer device. However, in other embodiments, the self-centering flat spring 102 may be curved. The self-centering flat spring 102 is described in more detail below.

The retainer housing 106 is designed to serve as a cap to secure the self-centering flat spring 102. Thus, the retainer housing 106 includes a protruding edge around the perimeter of the retainer housing so that the retainer housing can be placed over the self-centering flat spring 102. The retainer housing 106 may be designed to fit onto a larger structure to attach the user input device onto that larger structure. As best shown in FIG. 2, the retainer housing 106 has a central opening 212 to accommodate the user interface structure 104 with sufficient additional space for the user interface structure to be displaced in any X-Y direction. In the illustrated embodiment, the central opening 212 of the retainer housing 106 is a circular opening. However, in other embodiments, the central opening 212 may have a different shape as long as the opening is large enough to accommodate the user interface structure 104 with sufficient additional space for the user interface structure to be displaced in any X-Y direction. In the illustrated embodiment, the self-centering flat spring 102 is circular in shape. Thus, the retainer housing 106 is also circular in shape to house and secure the self-centering flat spring 102. However, in other embodiments, the self-centering flat spring 102 and/or the retainer housing 106 may have a different shape.

Figure 3:
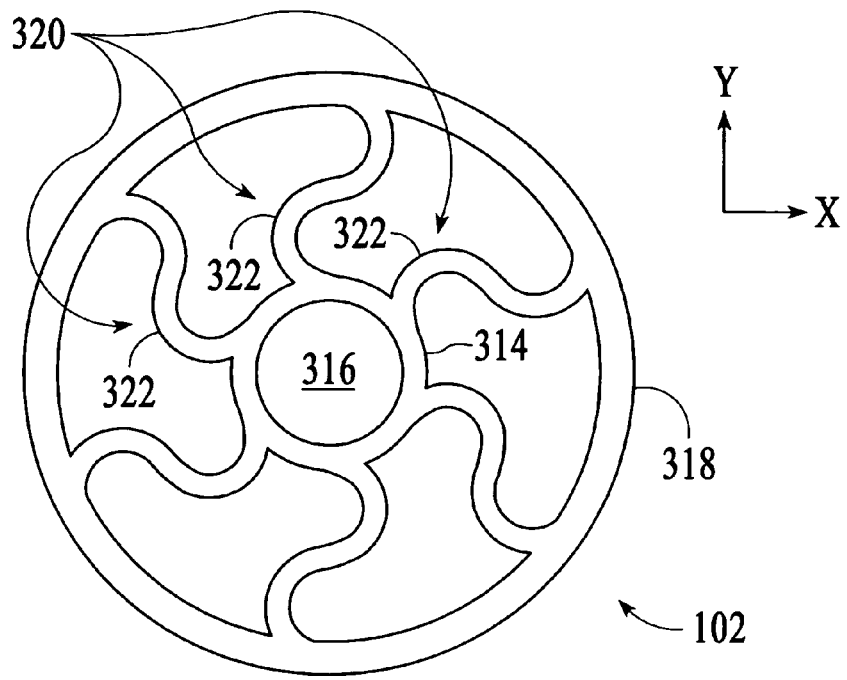
FIG. 3 is a top view of a self-centering flat spring, which is included in the user input device of FIGS. 1 and 2, in accordance with an embodiment of the invention.

The self-centering flat spring 102 is described in more detail with reference to FIG. 3, which is an enlarged top view of the self-centering flat spring. As shown in FIG. 3, the self-centering flat spring 102 includes an inner portion 314 that has a central hole 316. In the illustrated embodiment, the inner portion 314 is circular in shape. Thus, the perimeter of the inner portion 314 is substantially a circle. However, in other embodiments, the inner portion 314 may have a different shape, which may be symmetrical. In the illustrated embodiment, the central hole 316 of the inner portion 314 is circular in shape. Thus, the inner portion 314 of the self-centering flat spring 102 is annular in shape. However, in other embodiments, the central hole 316 of the inner portion 314 may have a different shape, which may be symmetrical. Although the inner portion 314 is shown to be a continuous portion about the central hole 316, the inner portion may have one or more breaks in other embodiments. The size and shape of the central hole 316 of the inner portion 314 may conform or be similar to the cross-section of the stem portion 210 of the user interface structure 104 along a plane parallel to the upper surface of the user interface structure so that the stem portion can fit into the central hole of the inner portion.

The self-centering flat spring 102 also includes an outer rim portion 318, which surrounds the inner portion 314. In the illustrated embodiment, the outer rim portion 318 of the self-centering flat spring 102 is circular in shape. Thus, the perimeter of the outer rim portion 318 is substantially a circle. In particular, the outer rim portion 318 of the self-centering flat spring 102 is annular in shape. However, in other embodiments, the outer rim portion 318 may have a different shape, which may be symmetrical. Although the outer rim portion 318 is shown to be a continuous portion surrounding the inner portion 314, the outer rim portion may have one or more breaks in other embodiments. In the illustrated embodiment, the outer rim portion 318 lies on the same plane as the inner portion 314, and thus, the self-centering flat spring 102 is flat or planar. However, in other embodiments, the inner portion 314 may be raised or lowered with respect to the outer rim portion 318. Thus, in these embodiments, the self-centering flat spring 102 may be curved and not be completely flat or planar.

The self-centering flat spring 102 also includes a flexible connecting portion 320 that connects the inner portion 314 with the outer rim portion 318. Thus, the connecting portion 320 is positioned between the inner portion 314 and the outer rim portion 318, and is attached to both of these portions. In this embodiment, the connecting portion 320 includes a number of meandering strips 322 that connect different points on the inner portion 314 to different points on the outer rim portion 318. Specifically, the meandering strips 322 connect different points on the perimeter of the inner portion 314 to different points on the inner edge of the outer rim portion 318. As illustrated in FIG. 3, the meandering strips 322 may be S-shaped or inverse S-shaped. Thus, each meandering strip 322 is curved with two turns. However, in other embodiments, the meandering strips 322 may be curved with any number of turns. The meandering strips 322 may be symmetrical with respect to the center of the self-centering flat spring.

The meandering strips 322 are designed to bend so that the inner portion 314 can be moved laterally in any X-Y direction when lateral pressure is applied to the inner portion and can be moved vertically in the Z direction when downward pressure is applied to the inner portion. Thus, a user can move the user interface structure 104, which is supported by the inner portion 314 of the self-centering flat spring 102, in any X-Y direction and/or the Z direction. The meandering strips 322 are also designed to unbend to return to its original resting configuration when the lateral and/or downward pressure is removed from the inner portion 314. Thus, the inner portion 314 will return to its initial resting position, e.g., the center of the self-centering flat spring 102, when no pressure is exerted on the inner portion. Consequently, the user interface structure 106, which is supported by the inner portion 314, will return to its initial resting position when the user interface structure is released by the user.

In an embodiment, the self-centering flat spring 102 is made of a plastic material, which may be any polymer, including elastomers. However, other suitable material may be used to form the self-centering flat spring 102 with the desired characteristics. The elastic limit of the material used is chosen to not exceed the particular application and conditions of use of the self-centering flat spring 102. In the illustrated embodiment, the inner portion 314, the outer rim portion 318 and the meandering strips 322 of the connecting portion 320 are an integral single piece unit. However, in other embodiments, the self-centering flat spring 102 may be made of multiple pieces that are attached to each other. The self-centering flat spring 102, as a whole or in parts, can be made by the use of common mass production techniques, such as plastic injection molding and stamping.

Figure 4:
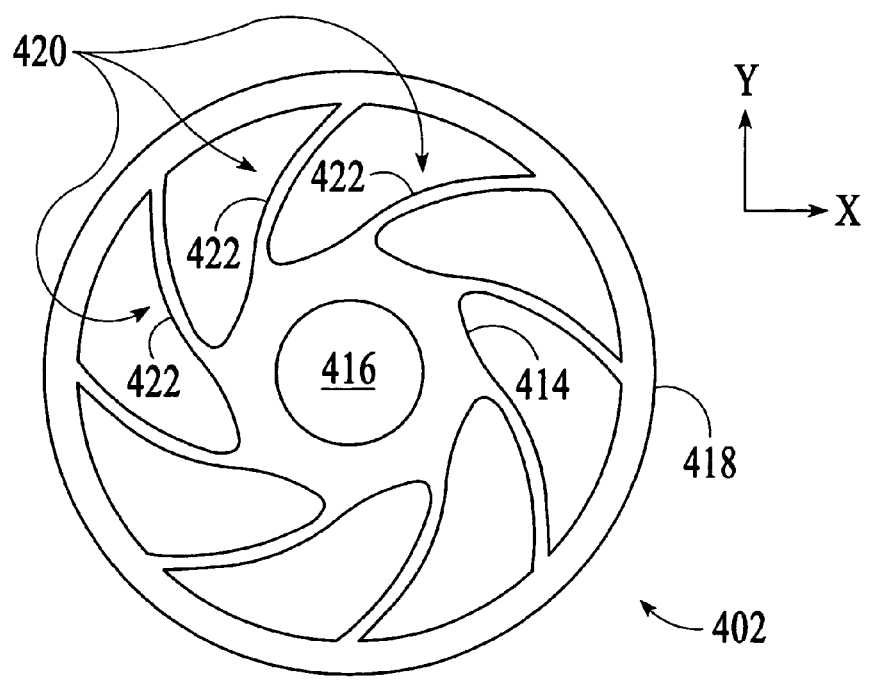
FIG. 4 is a top view of a self-centering flat spring in accordance with another embodiment of the invention.

Turning now to FIG. 4, a self-centering flat spring 402 in accordance with another embodiment of the invention is shown. The self-centering flat spring 402 is similar to the self-centering flat spring 102. The self-centering flat spring 402 includes an inner portion 414, an outer rim portion 418 and a flexible connecting portion 420 of meandering strips 422. The outer rim portion 418 of the self-centering flat spring 402 is virtually identical to the outer rim portion 318 of the self-centering flat spring 102. The inner portion 414 of the self-centering flat spring 402 differs in shape from the inner portion 314 of the self-centering flat spring 102. The inner portion 414 of the self-centering flat spring 414 is octagon-shaped with a central hole 416. Thus, the perimeter of the inner portion 414 is octagonal in shape. In addition, the meandering strips 422 of the self-centering flat spring 402 are configured differently than the meandering strips 322 of the self-centering flat spring 102. Each of the meandering strips 422 of the self-centering flat spring 402 is only slightly curved and extends in a direction that is substantially offset with respect to a radial direction.

Figure 5:
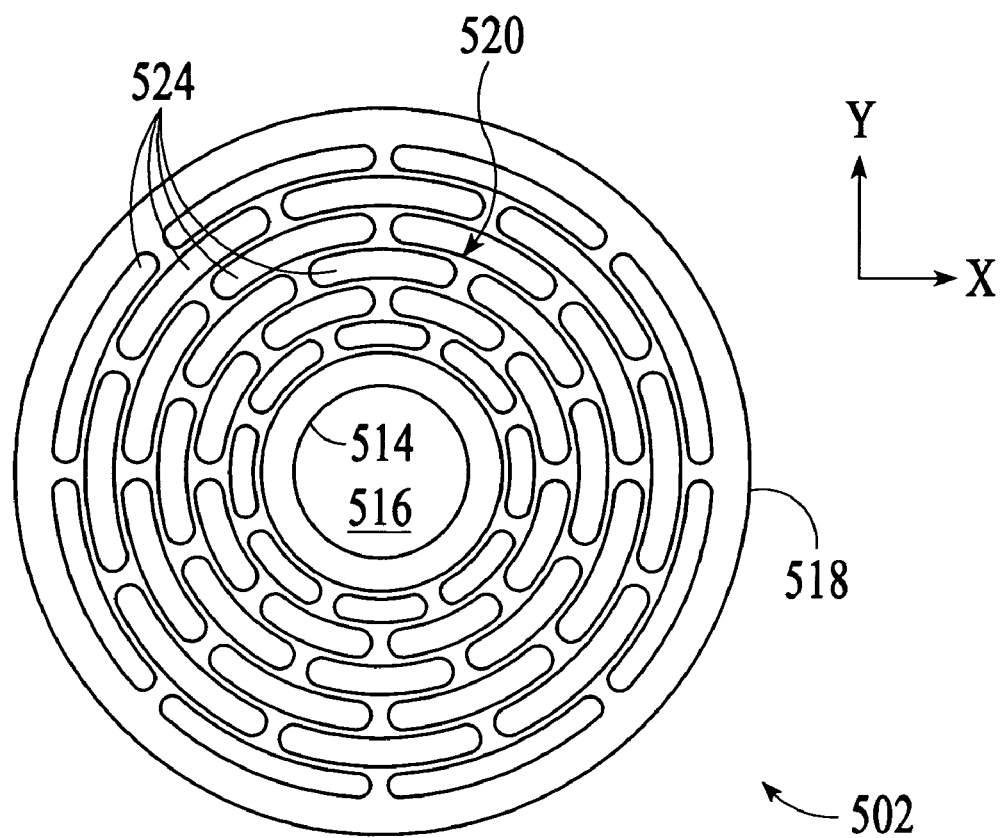
FIG. 5 is a top view of a self-centering flat spring in accordance with another embodiment of the invention.

Turning now to FIG. 5, a self-centering flat spring 502 in accordance with another embodiment of the invention is shown. The self-centering flat spring 502 is also similar to the self-centering flat spring 102. The self-centering flat spring 502 includes an inner portion 514, an outer rim portion 518 and a flexible connecting portion 520. The inner portion 514 and the outer rim portion 518 of the self-centering flat spring 502 are similar to the inner portion 314 and the outer rim portion 318 of the self-centering flat spring 102. However, the connecting portion 520 of the self-centering flat spring 502 is not made of meandering strips as the connecting portion 320 of the self-centering flat spring 102. Rather, the connecting portion 520 is a region of material with a plurality of holes 524, which is connected to the inner portion 514 and the outer rim portion 518. In the illustrated embodiment, the holes 524 of the connecting portion 520 vary in size and shape. Furthermore, the holes 524 of the connecting portion 520 that are of the same size and shape are positioned concentrically at a predefined distance from the center of the self-centering flat spring 502. However, in other embodiments, the holes 524 of the connecting portion 520 may be positioned in other arrangements. Furthermore, in other embodiments, the holes 524 of the connecting portion may be of the same size and/or shape.

The connecting portions 420 and 520 of both the self-centering flat springs 402 and 502, respectively, are designed to bend so that the connected inner portion 414 or 514 can be moved laterally in any X-Y direction and can be moved vertically in the Z direction. Furthermore, the connecting portions 420 and 520 of both the self-centering flat springs 402 and 502, respectively, are also designed to unbend or return to their original resting configurations when no pressure is exerted on them. Thus, the connected inner portion 414 or 514 will return to its initial resting position, e.g., the center of the respective self-centering flat spring 402 or 502, when no pressure is exerted on the inner portion. Consequently, the user interface structure 106, which is supported by the inner portion 414 or 514, will return to its initial resting position when the user interface structure is released by the user.

In an embodiment, the self-centering flat springs 402 and 502 are made of a plastic material, which may be any polymer, including elastomers. However, other suitable material may be used to form the self-centering flat springs 402 and 502 with the desired characteristics. The elastic limit of the material used is chosen to not exceed the particular application and conditions of use of the self-centering flat springs 402 and 502. In the illustrated embodiment, each of the self-centering flat springs 402 and 502 is an integral single piece unit. However, in other embodiments, the self-centering flat springs 402 and 502 may be made of multiple pieces that are attached to each other. The self-centering flat springs 402 and 502, as a whole or in parts, can be made by the use of common mass production techniques, such as plastic injection molding and stamping.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A user input device comprising:
a self-centering flat spring comprising:
an inner portion including a central hole, said inner portion being annular in shape such that said inner portion is continuous around said central hole;
an outer rim portion configured to surround said inner portion; and
a flexible connecting portion attached to said inner portion and said outer rim portion, said flexible connecting portion being configured to bend so that said inner portion is displaced laterally when lateral pressure is applied to said inner portion, said flexible connecting portion being further configured to unbend so that said inner portion is returned to an initial position when said lateral pressure is removed.

2. The device of claim 1 further comprising a user interface structure including a stem portion positioned in said central hole of said inner portion of said self-centering flat spring, said user interface structure being configured to be manipulated by a user.

3. The device of claim 1 wherein said self-centering flat spring is symmetrical in configuration.

4. The device of claim 2 wherein said self-centering flat spring is radially symmetrical in configuration.

5. The device of claim 1 wherein said self-centering flat spring is made of a plastic material.

6. The device of claim 1 wherein said self-centering flat spring is an integral single piece unit.

7. The device of claim 1 wherein said central hole of said inner portion of said self-centering flat spring is circular in shape.

8. The device of claim 1 wherein the perimeter of said inner portion of said self-centering flat spring is circular in shape.

9. The device of claim 1 wherein the perimeter of said outer rim portion of said self-centering flat spring is circular in shape.

10. The device of claim 1 wherein said flexible connecting portion of said self-centering flat spring includes a plurality of meandering strips, each of said meandering strips being connected to said inner portion and said outer rim portion of said self-centering flat spring.

11. The device of claim 10 wherein each of said meandering strips is S-shaped or inverse S-shaped.

12. The device of claim 10 wherein each of said meandering strips is slightly curved and extends in a direction that is substantially offset with respect to a radial direction.

13. The device of claim 1 wherein said flexible connecting portion of said self-centering flat spring is a region of material with a plurality of holes.

14. The device of claim 13 wherein said holes of said flexible connecting portion that are of same size and shape are positioned concentrically at a predefined distance from the center of said self-centering flat spring.

15. A user input device comprising:
a self-centering flat spring comprising:
- an inner portion including a central hole, said inner portion being annular in shape such that said inner portion is continuous around said central hole;
- an outer rim portion configured to surround said inner portion; and
- a flexible connecting portion attached to said inner portion and said outer rim portion, said flexible connecting portion being configured to bend so that said inner portion is displaced laterally when lateral pressure is applied to said inner portion, said flexible connecting portion being further configured to unbend so that said inner portion is returned to an initial position when said lateral pressure is removed; and a user interface structure including a stem portion positioned in said central hole of said inner portion of said self-centering flat spring, said user interface structure being configured to be manipulated by a user.

16. The device of claim 15 wherein said self-centering flat spring is radially symmetrical in configuration.

17. The device of claim 15 wherein said self-centering flat spring is an integral single piece unit and made of a plastic material.

18. The device of claim 15 wherein the outer rim portion of said self-centering flat spring is annular in shape.

19. The device of claim 15 wherein said flexible connecting portion of said self-centering flat spring includes a plurality of meandering strips, each of said meandering strips being connected to said inner portion and said outer rim portion of said self-centering flat spring.

* * * * *